Dec. 3, 1957    E. M. FAULKNER, 3RD    2,814,835
METHOD OF MAKING A BOWLING PIN
Filed May 3, 1955
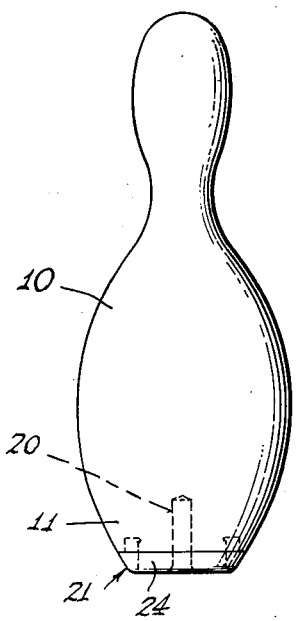
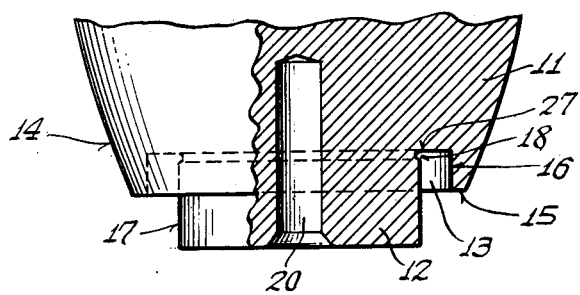
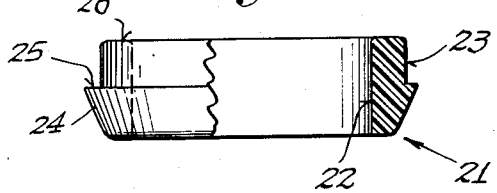
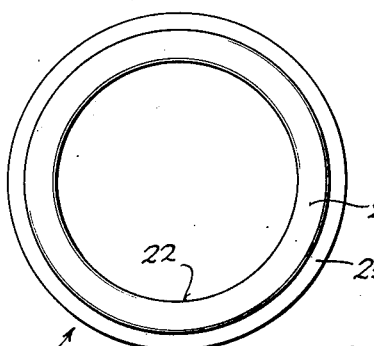
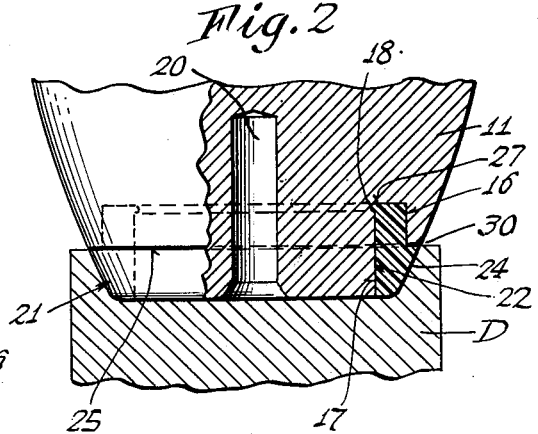
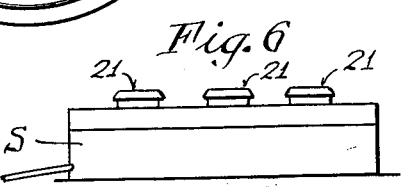
INVENTOR.
Ellis Faulkner
BY
Munn, Liddy, Nathanson & March
ATTORNEYS

United States Patent Office 2,814,835
Patented Dec. 3, 1957

2,814,835

METHOD OF MAKING A BOWLING PIN

Ellis M. Faulkner 3rd, Albany, N. Y., assignor to Albany Billiard Ball Company, Albany, N. Y., a corporation of New York Application May 3, 1955, Serial No. 505,677

4 Claims. (Cl. 18—59)

This invention relates to methods of making bowling pins.

For many years bowling pins were made wholly of hardwood, as for example, maple, being formed by turning on a lathe or similar machine to the required configuration, with solid butt ends. Pin-setting devices were then devised, having short studs which could be projected from the surface of the alley at the proper spots, for accurately setting or "spotting" the pins. For this purpose the pins were provided at their butt ends with recesses, arranged to receive the said studs.

The useful life of bowling pins made wholly from wood was somewhat limited, and it was found that the butt ends of the pins were particularly vulnerable and subject to deterioration. Only a slight chipping or deformation of these ends, especially the outer edge parts thereof, would cause the pin to set at an angle instead of upright, thereby rendering it unfit for further use.

With the advent of plastics there have been proposed and used plastic wear-resistant inserts where the pins were susceptible of wear or deterioration. Such inserts, usually in the form of rings, were placed on or in the butt ends of the pins, and greatly improved the latter by very appreciably extending the useful life thereof.

A number of methods have been used or proposed for applying the ring inserts or wear members to the pins. One method consisted of grooving the butt ends of the pins and press fitting premolded plastic rings in said grooves, to be retained therein by friction. Another method involved molding the plastic directly in the grooved butt ends of the pins. A further proposal involved an arrangement where the grooves in the butt ends were undercut and preformed plastic rings were forced into the grooves, said rings having yieldable beaded or projecting portions intended to occupy the undercuts and lock the rings in place. Still another proposal involved the provision of undercut grooves, in conjunction with premolded rings which were spun into the grooves under pressure and with considerable force, thereby to frictionally heat the rings and cause the plastic material thereof to flow into the undercuts and into roughened, porous surfaces of the wood.

While these methods have been to some measure satisfactory, they have all had drawbacks. The press-fitted rings could not be depended on to remain tight, and often worked loose due to the absence of undercutting and interlocking of the parts. Where preformed rings having yieldable beaded portions were employed, there was involved a costly molding operation involving dies having movable or retractable wall sections, and there existed a tendency for the beaded portions to shear off during assembly, even though they were formed so as to be yieldable. The molding of plastic material directly into the grooves involved costly molding equipment and a somewhat lengthy cycling. Where premolded plastic rings were spun and caused to adhere to the wood by frictional heating and softening, a special costly nylon type of plastic was necessary, and the assembly equipment was costly and involved a time-consuming operation.

The above disadvantages and drawbacks attendant the provision of plastic rings or wear members on bowling pins is obviated by the present invention. This is accomplished by the provision of a novel and simplified ring and recessed undercut pin structure, and method of attaching the ring to the pin, the latter being characterized by separate heating of portions only of the ring and the forceful application of said portions to the undercut recess to cause them to flow and conform to the undercut. By this method an inexpensive, cellulose acetate butyrate plastic, which is approved by the American Bowling Congress, may be used for the plastic ring or member, and attachment thereof to the pin may be quickly and economically carried out. The method, moreover, prevents looseness of the ring from occurring at any later time, and accordingly a pin so fabricated will have a long, useful life.

Accordingly it is an object of the invention to provide an improved method of making a bowling pin, which is extremely simple and economical, and which results in a product of high quality and long life.

Another object of the invention is to provide an improved method as above set forth, which does not require the use of complicated or expensive equipment, but instead may utilize simple heating and press equipment, such as an ordinary hot plate and arbor press.

A feature of the invention resides in the provision of an improved method, by which uniform results are obtained at all times, so that the quality of the product is high and there is obviated any possibility of defects showing up during use.

Other features and advantages will hereinafter appear.

In the accompanying drawings:

Fig. 1 is a side elevational view of an improved bowling pin made in accordance with the invention;

Fig. 2 is a fragmentary view of the lower or butt end portion of the pin, shown partly in elevation and partly in axial section; a portion of the assembly press is also shown;

Fig. 3 is a view like Fig. 2 but prior to assembly of the plastic ring to the pin;

Fig. 4 is a view partly in side elevation and partly in axial section of a molded plastic ring adapted for use with the pin structure shown in Fig. 3;

Fig. 5 is a top view of the plastic ring shown in Fig. 4; and

Fig. 6 is a front elevation of an electric heater on which a number of rings are being heated.

Referring to Figs. 1–3, the improved bowling pin as provided by this invention comprises a wooden body 10 having the usual contour and round shape, said body having a butt end 11 including a base portion 12 provided with a continuous annular groove 13. From the base portion 12 outer walls 14 of the body 10 extend angularly upward in divergent directions, and it will be noted that the groove 13 is disposed both in said outer walls 14 and said base portion 12, the groove extending around the latter and forming a continuous edge 15 around the body 10 at the juncture of the groove with the outer walls. The groove 13, in the embodiment of the invention illustrated herein, has a cylindrical outer wall 16 and a cylindrical inner wall 17, the latter being provided with an undercut 18 at the bottom of the groove.

As is usual, the butt end 11 of the bowling pin has the usual recess 20 for receiving the positioning studs of the pin-setting apparatus.

For use with the pin structure described above and as illustrated in Fig. 3, I provide an inexpensive plastic ring or wear member 21, Fig. 4, which may be easily formed in simple molds, of economical or inexpensive plastic. I prefer to mold the ring 21 of cellulose acetate butyrate plastic, although other suitable substances may also be used. It is, however, essential that the substance used be thermo-plastic, that is, softenable or plasticizable upon the application of heat. Referring to Fig. 4, the ring 21 has a cylindrical inner surface 22 and at its upper portion a cylindrical outer surface 23, enabling the ring to snugly fit into the groove 13. The lower portion of the ring 21 is outwardly flared to provide a skirt 24, by which an upwardly facing shoulder 25 is formed on its outer periphery. The length of the upper portion of the ring 21, measured from the shoulder 25 to the top face 26 is made greater than the depth of the groove 13 as measured from the continuous edge 15 to the bottom of the groove indicated at 27 (which constitutes the uppermost portion as viewed in Fig. 3).

In accordance with the method of this invention, the upper surface 26 and adjoining portions thereof of the ring 21 are heated and plasticized to such an extent that they may readily flow under pressure, while the remainder of the ring is kept relatively cool to preserve its configuration. This may be accomplished in various ways. For example, as shown in Fig. 6, the rings 21 may be placed on a thermostatically controlled electric hot plate S, which may have a temperature on the order of 275 degrees F. I have found that after an interval of approximately 4 minutes with the surface 26 of a ring 21 resting on the hot plate, the plastic will be plasticized or rendered sufficiently soft to flow under pressure. The hot plate S may have a shield or baffle of asbestos or other material, surrounding the rings 21 to prevent excessive heating of the skirt portions 24 thereof by radiation.

After a ring 21 has been heated in this manner it is placed in the groove 13 and the assembly positioned in a small hydraulic press or arbor press. The ring 21 is then forced upward into the groove 13, whereupon the heated face 26 and adjoining portions will flow, under the pressure existing, and occupy the entire bottom of the groove and the undercut 18. This is shown in Fig. 3, wherein a die D of the press is illustrated as holding the ring 21.

There is thus provided a positive mechanical lock between the ring 21 and the butt end 11 of the bowling pin 10. I have found that the plastic of the ring 21 will quickly set, due to the cooling influence of the pin, after which it is impossible to remove the ring from the pin without first destroying either one or the other.

As shown in Fig. 2, preferably the length of the upper portion of the ring, measured from the shoulder 25 upward is greater than the depth of the groove 13 so that the plastic material will completely fill the groove and the undercut thereof with a slight amount of excess, whereby a clearance 30 exists in the completed product between the shoulder 25 of the ring and the edge 15 of the pin. This clearance is clearly shown in Fig. 2 and insures complete filling of the groove by the plastic material, and an effective interlock since during the assembly operation the shoulder 25 cannot interfere with the proper flow of the softened plastic within the groove.

In accordance with the method of this invention as above set forth it is not necessary for the plastic ring 21 to have molded beads or other projecting portions for the purpose of effecting an interlock, and accordingly the molding of the ring may be quickly and economically carried out in simple molds, using inexpensive cellulose acetate butyrate plastic, such as is approved by the American Bowling Congress. This plastic is quite soft and not highly resilient or flexible, and by the elimination of projecting beads or other portions heretofore depended on for an interlock, there is not present the danger of such beads or portions being sheared off or deformed during assembly of the plastic to the pin.

It will be appreciated that the molding of the ring 21 and the subsequent heating and assembly of the ring to the pin may be carried out with simple and inexpensive equipment, the latter two operations involving merely the thermostatically controlled electric hot plate and the simple arbor press or small hydraulic press. By virtue of the application of heat to the ring 21 to soften portions thereof it is not necessary to use specially developed materials, as for example, a special-formula nylon or the like, which were heretofore required where the heat of friction due to spinning is depended on.

The assembly operation by which the ring 21 is attached to the pin 10 is virtually as rapid as methods which are used for press fitting rings to pins without positive interlock, and thus no additional cost is entailed by the assembly operation.

It has been found that the improved method of making bowling pins as provided by this invention results in a high quality product of great uniformity and long useful life, with an advantageous economy in the manufacturing and assembly procedures.

While the present invention is illustrated and described in connection with the provision of wear resistant rings to the butt ends of the bowling pins, it should be understood that the invention is not limited to the specific structure illustrated and described; instead the scope is more properly defined in the appended claims.

Variations and modifications may be made within the scope of the claims and portions of the improvements may be used without others.

I claim:

1. The method of joining a bowling pin having in its base portion an annular recess provided with an undercut and having an annular shoulder surrounding said recess to a thermoplastic wear member which has an annular shoulder and a projecting portion extending above said shoulder, the height of said projecting portion being greater than the depth of said recess measured from the shoulder of the pin, which includes the steps of heating to a state of plasticity that portion of said wear member which is intended to enter the recess prior to its entry therein, inserting said heated portion into said recess prior to its cooling, and immediately thereafter applying sufficient force to the member to force the heated portion thereof completely into the recess and to conform it to the contour of the recess and the undercut thereof.

2. The method of joining a bowling pin having at its base portion an annular groove provided with an undercut and having an annular shoulder surrounding said groove to a thermoplastic ring which has an annular shoulder and a projecting portion extending above said shoulder, the height of said projecting portion being greater than the depth of said groove measured from the shoulder of the pin which includes the steps of heating to a state of plasticity that portion only of said ring which is intended to enter the groove prior to its entry therein, inserting said heated ring portion into the groove prior to its cooling, and immediately thereafter applying sufficient force to the ring to force the heated portion thereof completely into the groove and to conform it to the contour of the groove and the undercut.

3. The method of joining a bowling pin having a groove and undercut butt end and having a shoulder surrounding said groove to a thermoplastic ring which has an annular shoulder and a projecting portion extending above said shoulder, the height of said projecting portion being greater than the depth of said groove measured from the shoulder of the pin, which includes the steps of placing the ring on a heated surface to plasticize that portion only of the ring which is intended to enter the groove prior to its entry therein, inserting said plasticized ring portion into the groove prior to its cooling, and immediately thereafter applying sufficient force to the ring to force the plasticized portion thereof completely into the groove and to conform it to the contour of the groove and the undercut.

4. The method of joining a bowling pin having a groove and undercut butt end and having an annular shoulder surrounding said groove to a thermoplastic ring which has an annular shoulder and a projecting portion extending above said shoulder, the height of said projecting portion being greater than the depth of said groove measured from the shoulder of the pin, which includes the steps of heating to a state of plasticity that portion only of said ring which is intended to enter said groove prior to its entry therein, inserting said heated ring portion into the groove prior to its cooling, and immediately thereafter placing said pin and inserted ring in a press and applying force to the ring sufficient to force the heated portion thereof completely into the groove and to conform it to the contour of the groove and the undercut.

References Cited in the file of this patent

UNITED STATES PATENTS

| | | |
|---|---|---|
| 2,366,274 | Luth et al. | Jan. 2, 9145 |
| 2,680,023 | Ellis | June 1, 1954 |
| 2,701,719 | Di Pierro | Feb. 8, 1955 |

FOREIGN PATENTS

| | | |
|---|---|---|
| 591,934 | Great Britain | Sept. 2, 1947 |